Patented Aug. 17, 1943

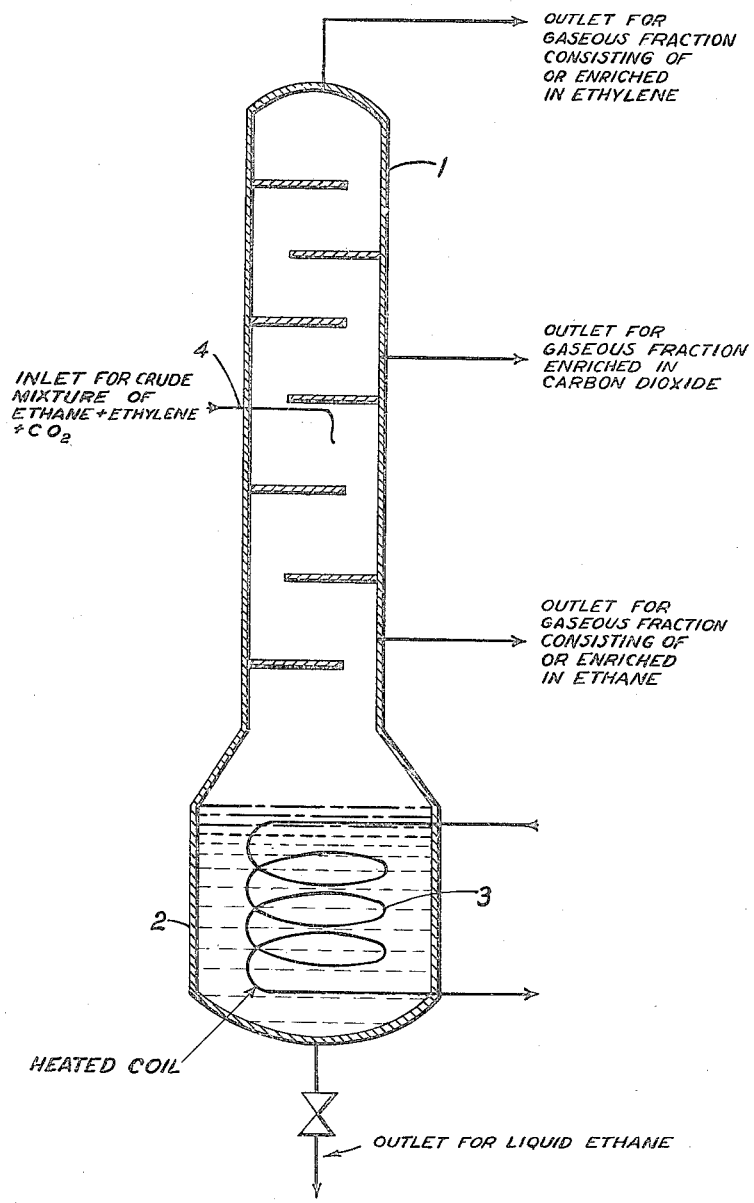

2,327,134

UNITED STATES PATENT OFFICE 2,327,134

EXTRACTION OF HYDROCARBONS FROM GAS MIXTURES WHICH, BESIDES HYDROCARBONS, CONTAIN CARBON DIOXIDE

Paul Maurice Schuftan, Richmond Hill, England, assignor to The British Oxygen Company Limited, London, England Application April 24, 1941, Serial No. 390,116
In Great Britain June 14, 1940

2 Claims. (Cl. 62—175.5)

The present invention relates to the extraction of hydrocarbons from gas mixtures which, besides hydrocarbons, contain carbon dioxide. More especially, the invention relates to a liquefaction process for separating such mixtures and is particularly applicable to the recovery of ethylene and ethane from coal distillation gases, hydrogenation gases, natural gases, cracking gases and the like.

In order to effect the extraction of hydrocarbons, such gas mixtures may be subjected to cooling at atmospheric or increased pressure so as to obtain initially a crude fraction containing the desired hydrocarbons and the crude fraction can subsequently be revaporised or further separated by rectification. While it has hitherto been deemed necessary to eliminate carbon dioxide completely from the initial gas mixture before cooling in order to avoid obstructions by solid deposits of carbon dioxide, it has now been found that such obstructions can be avoided without previous total elimination of the carbon dioxide if the carbon dioxide content of the crude liquid hydrocarbon fraction is so controlled that while it may be in excess of its solubility in the crude liquid fraction at the condensation temperature, the carbon dioxide content in the final products does not exceed the limit of solubility at the temperature at which the final products begin to vaporise.

The temperatures of liquefaction of the crude hydrocarbon fraction and of the vaporisation of the final products are determined by the partial pressures of the hydrocarbons contained in the co-existing vapour phase, that is, by the product of the hydrocarbon concentration and the total pressure. The temperature of liquefaction will thus depend on the hydrocarbon content in the initial gas and the pressure to which this gas has been compressed, while the revaporisation pressure will be determined by the concentration of the hydrocarbon fraction and the pressure at which this fraction, or the products separated therefrom are revaporised. According to the circumstances, the liquefaction temperature may thus be lower or higher than the temperature of revaporisation. As a rule the liquefaction temperature will be substantially lower than the revaporisation temperature. This is so in the case of the extraction of ethylene and ethane from coal distillation gases, a case for which the present investigation is particularly applicable.

The solubility of the carbon dioxide in hydrocarbons considerably increases with increasing temperature. Therefore, while the carbon dioxide content of the crude hydrocarbon fraction may, where the liquefaction temperature is lower than the revaporisation temperature, be in excess of its solubility, the carbon dioxide will, at the temperature of revaporisation, be wholly in solution.

If a separation of the crude fraction is required, the carbon dioxide content thereof will have to be so controlled that it is below its limit of solubility in the hydrocarbon fraction in which it remains after the other fraction or fractions has or have been removed. For example, in the case of a recovery of ethylene and ethane, where the carbon dioxide will be obtained together with the ethane, the amount of carbon dioxide present in the crude fraction must not exceed the solubility in the ethane fraction at the temperature at which this fraction is revaporised, and the maximum carbon dioxide content which can be admitted is, therefore, determined by the ethane content of the original gas and the pressure under which the ethane fraction is revaporised. Should the original gas contain carbon dioxide in excess of this limit, the balance will have to be removed either by a chemical treatment prior to the cooling, or by condensation in continuous or alternating coolers.

When seaprating a hydrocarbon fraction from a crude mixture containing inter alia ethane and carbon dioxide, special difficulties have been encountered and these are avoided in accordance with the further features of the invention now to be described. These features are based on the discovery that the system carbon dioxide/ethane forms an azeotropic mixture, that is, over a liquid mixture of ethane and carbon dioxide the carbon dioxide content is higher in the vapour than in the liquid although, according to the vapour pressures, the contrary was to be expected.

Therefore, if a crude fraction containing hydrocarbons of lower boiling point than ethane is subjected to rectification, carbon dioxide would tend to enrich in the middle of the rectification column, thereby making the separation of the mixture much more difficult and causing at the same time danger of obstruction in that zone. On the other hand, should ethane be the lowest boiling hydrocarbon in the crude mixture, not pure ethane, but a mixture of ethane and carbon dioxide would be obtained at the top of the recification column.

These difficulties may be eliminated by introducing the crude fraction into the rectification column in liquid form and at its vaporisation temperature. This ensures an ample excess of reflux liquid in the rectification column. A further means for facilitating the rectification is to withdraw the carbon dioxide as a gaseous fraction.

The manner in which the invention may be carried into effect is shown in the accompanying diagrammatic representation of the conventional type of rectification apparatus. The apparatus comprises the usual column 1 having at the base a reservoir 2 for boiling liquid with a heating coil 3. The crude liquid mixture of ethane, ethylene and carbon dioxide is introduced through a conduit 4, which delivers the liquid into the column at approximately the middle point. Depending upon the operation temperature and pressure in relation to the hydrocarbon content of the crude mixture a fraction consisting of or enriched in ethylene may be withdrawn from the upper part of the column; another fraction consisting of or enriched in ethane may be withdrawn from the lower part of the column and a fraction enriched in carbon dioxide may be withdrawn from an intermediate point as shown in the drawing.

By proceeding in the manner described above it is possible to recover at least one hydrocarbon fraction free from carbon dioxide. If the boiling point of the hydrocarbon fraction to be recovered free from carbon dioxide is lower than that of ethane, as is the case with ethylene, the withdrawal point for that fraction must be located above the inlet for the crude liquid and a gaseous fraction containing carbon dioxide and ethane is then withdrawn from a point below the inlet. If ethane substantially free from carbon dioxide is to be recovered, it must be withdrawn from the column below the inlet for the crude liquid and a gaseous fraction containing carbon dioxide and constituents having a lower boiling point than ethane is then withdrawn from a point above the inlet. If an ethylene fraction and an ethane fraction are to be recovered, both substantially free from carbon dioxide, a gaseous fraction containing carbon dioxide and some ethylene and ethane is withdrawn from a point between the points of withdrawal of the ethylene and ethane fractions. The relative proportional yields of carbon dioxide-free ethylene and carbon dioxide-free ethane will be determined by the location of the withdrawal point for the carbon dioxide fraction, namely, whether it is above or below the inlet for the crude fraction. The higher the point of withdrawal of the carbon dioxide fraction the lower the yield of ethylene relatively to ethane and vice versa.

If ethane is the hydrocarbon of lowest boiling point contained in the crude hydrocarbon fraction, the fraction rich in carbon dioxide will have to be withdrawn in gaseous state at the top of the column, while ethane substantially free from carbon dioxide can be recovered at a lower point of the column and any hydrocarbons of still higher boiling point at the bottom of the column.

In the special case where a carbon dioxide content in the ethane fraction would not be objectionable, the whole, or substantially the whole of the ethane fraction can be withdrawn from the column in gaseous state, together with any carbon dioxide present in the crude hydrocarbon fraction. A small part of the ethane fraction may, however, be drained from the column in liquid state if it were necessary to avoid an enrichment of constituents of higher boiling point, such as propylene, butylene, etc.

The manner in which the discovery that the ethane-carbon dioxide system forms an azeotropic mixture may be used to advantage in extracting from coke oven gas an ethylene fraction substantially free from carbon dioxide simultaneously with an ethane fraction is shown in the ensuing example:

A coke oven gas is initially treated to remove constituents such as water, naphthalene and any hydrocarbons having a boiling point higher than that of ethane. After such pretreatment the gas has the following hydrocarbon content:

| | Per cent |
|---|---|
| Ethane | 1.06 |
| Ethylene | 2.38 |
| Methane | 29.35 |

These hydrocarbons are in admixture with carbon dioxide and constituents of low boiling point such as carbon monoxide, nitrogen and hydrogen.

Since it is desired to extract a carbon dioxide-free ethylene fraction from this mixture, the carbon dioxide present must be retained in the ethane fraction and the amount of carbon dioxide must therefore not exceed the limit of solubility of the gas in the ethane fraction at the temperature of revaporisation. If the revaporisation pressure of the ethane fraction is 0.3 atmosphere gauge, the boiling point will be 192° K. At this temperature the solubility of carbon dioxide in liquid ethane has been found by me to be 9.5% by volume. It follows therefore that with a gas having the foregoing hydrocarbon content, the maximum amount of carbon dioxide which may be present is 0.11%.

If the separation is carried out in a rectification column, a liquid ethane fraction containing up to 0.11% carbon dioxide may be withdrawn from the base of the column and an ethylene fraction substantially free from carbon dioxide may be withdrawn in gaseous form from the top of the column.

If the ethane fraction containing carbon dioxide is to be recovered in gaseous form, the carbon dioxide may be in excess of 0.11% as, by virtue of the formation of an azeotropic system, the vapour over a solution of carbon dioxide in liquid ethane is richer in carbon dioxide than the liquid. An adequate margin for fluctuations under commercial operating conditions is provided if, instead of working with a carbon dioxide content of 0.11%, the maximum figure does not exceed 0.0955%, corresponding to a volume of 8.2% carbon dioxide in the ethane fraction.

If the crude ethylene-ethane condensate is produced under a pressure of 2 atmospheres absolute and the condensation is carried out in a reflux cooler, the temperature at the base of the cooler will be 139° K. and the condensate will have the following composition:

| | Per cent |
|---|---|
| Carbon dioxide | 2.41 |
| Ethane | 29.23 |
| Ethylene | 57.55 |
| Methane | 10.10 |

The solubility of carbon dioxide in such a liquid will be only 1.96% so that a small amount of suspended solid carbon dioxide will be present in the liquid. The further rectification and vaporisation of the crude condensate is, however, performed at a higher temperature and the carbon dioxide then goes wholly into solution and no obstructions by solid carbon dioxide can occur.

An example will now be given of the case in which it is desired to separate an ethylene-ethane-carbon dioxide mixture into two fractions, one consisting of ethane substantially free from carbon dioxide and the other a mixture of ethylene and carbon dioxide.

The mixture contains equal volumes of ethylene and ethane and the rectification is carried out at atmospheric pressure which corresponds to a vaporisation temperature for the ethylene fraction of 169° K. The solubility of carbon dioxide in ethylene at this temperature is 13% by volume and the maximum carbon dioxide content in the raw gas will therefore be 0.15 part or 6.95 volumes per cent. If the raw gas is at a pressure of 10 atmospheres, the condensation temperature of the hydrocarbon fraction will be 230° K. At this temperature the amount of carbon dioxide in the raw gas is completely soluble in the liquid formed and when the mixture is rectified at atmospheric pressure the carbon dioxide will be wholly eliminated with the ethylene, leaving behind an ethane fraction substantially free from carbon dioxide.

I claim:

1. A process for separating a mixture comprising carbon dioxide, ethane and ethylene which comprises subjecting said mixture to rectification in a rectification zone, withdrawing a fraction enriched in ethane from below said zone, withdrawing a fraction enriched in ethylene from above said zone and withdrawing a fraction enriched in carbon dioxide from a point located between the points of withdrawal of the ethane and ethylene enriched fractions.

2. A process for separating a mixture comprising carbon dioxide, ethane and ethylene which comprises subjecting said mixture to rectification in a rectification zone, withdrawing a fraction enriched in ethane from below said zone, and withdrawing an ethylene-carbon dioxide fraction from the upper part of said zone.

PAUL MAURICE SCHUFTAN.